(12) United States Patent
Chang et al.

(10) Patent No.: US 6,303,006 B1
(45) Date of Patent: Oct. 16, 2001

(54) SYSTEM AND METHOD FOR DISTILLING LIQUID

(76) Inventors: Chia-Wei Chang, No. 8, Lane 109, Nen-Chiang St.; Charlie S. F. Chang, No. 608, An-Ning St., both of San-Ming Dist., Kaohsiung; Shen Tsung-Lin, No. 1, Lane 33, Bai-Mi Road, Kangshan, Kaohsiung, all of (TW)

(*) Notice: Subject to any disclaimer, the term of this patent is extended or adjusted under 35 U.S.C. 154(b) by 0 days.

(21) Appl. No.: 09/333,911

(22) Filed: Jun. 16, 1999

(51) Int. Cl.[7] .................................. B01D 3/10; B01D 3/42
(52) U.S. Cl. .............................. 203/1; 202/160; 202/181; 202/182; 202/185.3; 202/189; 202/205; 203/2; 203/11; 203/91; 203/100; 203/DIG. 8
(58) Field of Search ..................................... 202/205, 160, 202/182, 269, 185.3, 189, 181; 203/11, DIG. 8, 91, 2, 1, DIG. 18, 100; 159/44, 22; 55/DIG. 23; 96/140, 193; 95/1

(56) References Cited

U.S. PATENT DOCUMENTS

| | | | |
|---|---|---|---|
| 3,458,404 | * | 7/1969 | Vincent et al. ........................ 202/176 |
| 3,635,799 | * | 1/1972 | Lowi, Jr. ................................ 203/10 |
| 4,235,678 | * | 11/1980 | McKien ................................ 202/205 |
| 4,954,223 | * | 9/1990 | Leary et al. .......................... 202/181 |
| 5,441,606 | * | 8/1995 | Schlesinger et al. ................ 202/202 |
| 5,525,200 | * | 6/1996 | LaNois et al. ....................... 202/205 |
| 5,549,794 | * | 8/1996 | Mar ................................... 202/185.1 |
| 5,676,800 | * | 10/1997 | Chen ....................................... 203/1 |

FOREIGN PATENT DOCUMENTS 311588    7/1997   (TW) .

* cited by examiner

Primary Examiner—Virginia Manoharan
(74) Attorney, Agent, or Firm—Bacon & Thomas

(57) ABSTRACT

A vacuum type distilling system includes a sealed container including a vaporization chamber for containing a liquid and a condensation chamber, a pressure-reducing device, a condensing device, a heating device, and a vapor-collecting device including a floating piston for separating liquid and vapor and a guide tube for guiding vapor generated in the vaporization chamber into the condensation chamber. Liquid to be distilled is filled into the vaporization chamber and the pressure of the sealed container is reduced such that the boiling point of the liquid in the vaporization chamber is lowered. The heating device heats and thus vaporizes the liquid in the vaporization chamber into vapor which is immediately conveyed into the condensation chamber where vapor is condensed into distilled liquid by a condensing tube of the condensing device that is mounted in the condensation chamber.

34 Claims, 2 Drawing Sheets

SYSTEM AND METHOD FOR DISTILLING LIQUID

BACKGROUND OF THE INVENTION

1. Field of the Invention

The present invention relates to a system for distilling liquid, and more particularly to a vapor collecting type distilling system for distilling seawater at a lower temperature to thereby obtain pure water. The present invention also relates to a method for distilling liquid.

2. Description of the Related Art

Taiwan Utility Model Publication No. 311588 entitled "APPARATUS FOR PURIFYING SEAWATER INTO PURE WATER" issued on Jul. 21, 1997 utilizes an exhaust pipe of the engine and an exhaust pipe of the engine of a generator as well as a condensing device. The condensing device includes an inlet and an outlet for water circulating, a distilling water inlet for pouring, and a condensing tube. The apparatus is characterized in that the exhaust pipe of the vessel engine and the exhaust pipe of the generator engine are enclosed by a metal plate to form a vaporizing device. A separation plate is mounted in the metal plate to separate the exhaust pipe of the vessel engine from the exhaust pipe of the generator engine such that the exhaust pipe of the vessel engine is located in a sealed steam chamber and the exhaust pipe of the generator engine is located in a thermostatic chamber. In addition, a water inlet tube and a steam tube are mounted to an upper part of the steam chamber, wherein one end of the water inlet tube is extended into the steam chamber and associated with the exhaust pipe of the vessel engine, the other end of the water inlet tube is connected to the water inlet of the condensing device, and the steam tube is connected to an end of the condensing tube of the condensing device.

In the above apparatus, water is vaporized in the steam chamber by means of heat generated by the exhaust pipe of the vessel engine. The amount of steam generated and the vaporizing efficiency are both low. In addition, the distilled water cannot be collected reliably since most of the steam condenses and flows back to the steam chamber as a result of arrangement of the water inlet tube rather than enters the steam tube. Furthermore, purification of seawater is proceeded at normal pressure in which the boiling point of water at normal pressure is 100° C., yet the boiling point of seawater is slightly above 100° C. Thus, more energy is required for vaporizing seawater and for condensing the steam. The cost for production pure water is accordingly high.

The present invention is intended to provide an improved distilling system that mitigates and/or obviates the above problems.

SUMMARY OF THE INVENTION

It is a primary object of the present invention to provide a vacuum type distilling system in which pressure is reduced to lower the boiling point of the liquid such that the distilling can proceed at a boiling point lower than that of the liquid at normal pressure, thereby saving energy for vaporizing the liquid and avoiding energy waste during heat exchange at high temperature for condensing the steam.

It is a secondary object of the present invention to provide a distilling system in which vapor is not apt to contact with an inner wall of the container to avoid leading vaporized vapor back to the liquid surface, thereby improving the vaporizing efficiency.

In order to reduce the pressure in the distilling system, a vacuum pump is provided, and the vacuum is maintained after a dynamic balance between vaporization and condensation such that the vacuum pump can be turned off to minimize the operation cost.

In order to achieve the above objects, the distilling system of the invention lowers the boiling point of the liquid to be distilled by means of reducing pressure of a sealed container. As a result, distillation can be proceeded at a temperature lower than the boiling point of the liquid at normal pressure. In addition, vaporizing surface area is reduced such that a contact area between a level surface of the liquid and the vapor is reduced, and the possibility of returning of vapor back to the surface of the liquid is reduced to improve vaporizing efficiency.

A vacuum type distilling system in accordance with the present invention includes a sealed container including a vaporization chamber for containing a liquid and a condensation chamber, a pressure-reducing device connected with the sealed container, a condensing device, a heating device for heating and thus vaporizing the liquid in the vaporization chamber into vapor, a vapor-collecting device for collecting and guiding vapor generated in the vaporization chamber into the condensation chamber, and a condensing device for condensing vapor in the condensation chamber into distilled liquid.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
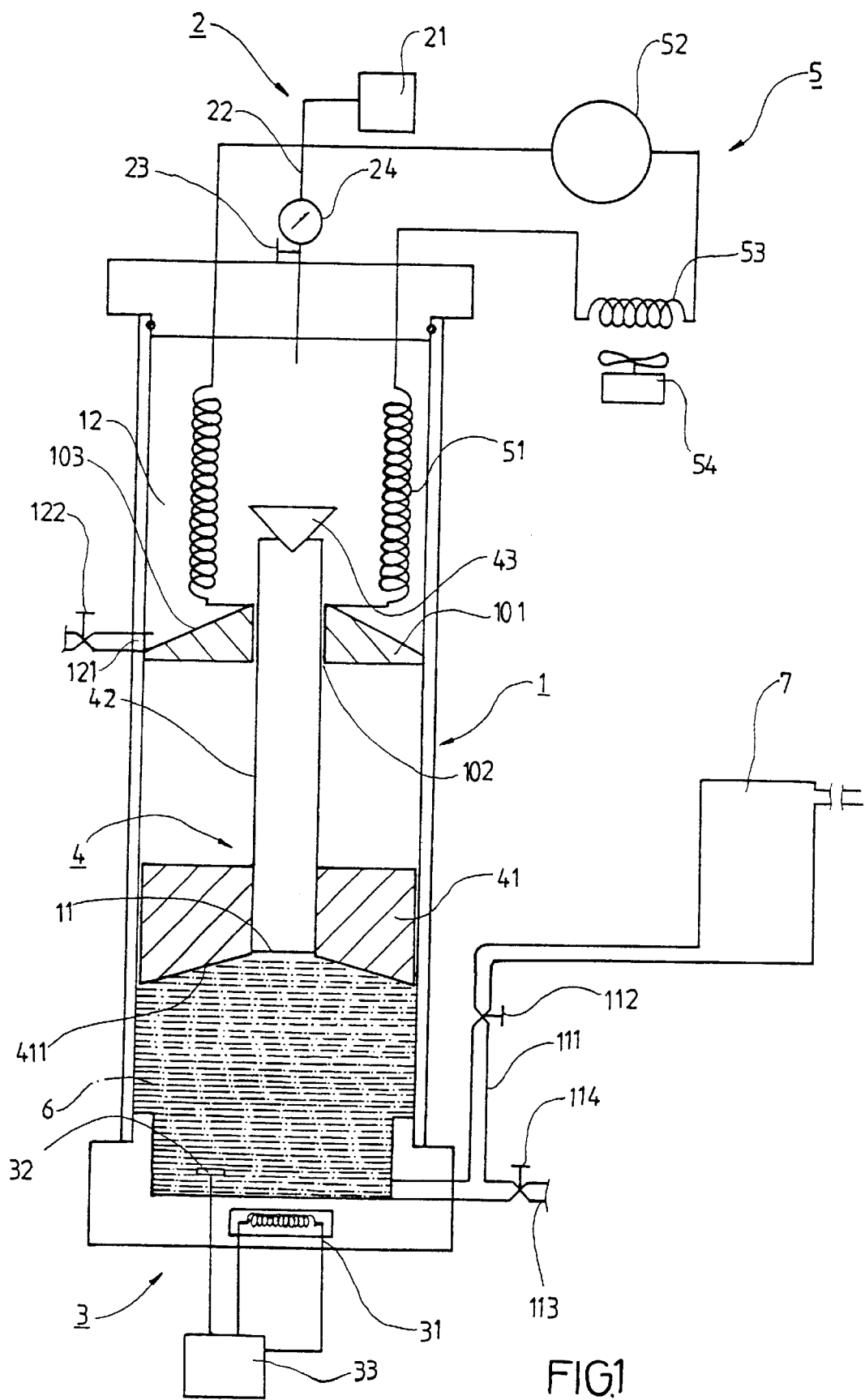
FIG. 1 is a schematic diagram illustrating an embodiment of a distilling system in accordance with the present invention.

Referring to FIG. 1, a distilling system in accordance with the present invention generally includes a sealed container 1, a pressure-reducing device 2, a heating device 3, a steam-collecting device 4, and a condensing device 5. The invention is illustrated by an example of distilling seawater into pure water. Nevertheless, it is appreciated that the invention may be applied to distillation of other liquid or fractional distillation of liquid mixture, not limited to distillation of seawater.

A water-collecting ring 101 is mounted in the container 1 to separate the container 1 into a lower vaporization chamber 11 and an upper condensation chamber 12. The water-collecting ring 101 is made of heat-insulating material so as to provide reliable heat insulation between the vaporization chamber 11 and the condensation chamber 12 to improve the condensation effect. Seawater 6 (or liquid) enters the vaporization chamber 11 via an inlet pipe 111. A valve 112 is mounted to the inlet pipe 111 in a manner that the valve 112 is opened when the level of seawater in the vaporization chamber 11 is lower than a pre-determined level and that the valve 112 is closed when the level of seawater in the vaporization chamber 11 reaches the pre-determined level.

Residual seawater 6 (or liquid) after distillation is drained via an outlet pipe 113 and a valve 114 is provided to control opening and closing of the outlet pipe 113. The water-collecting ring 101 includes an opening 102 in a central area thereof and an upper side 103 that inclines downwardly from an area surrounding the opening 102 toward a periphery thereof. The inclined upper side 103 guides condensed water to a peripheral area of the upper side 103 for temporary storage and prevents condensed water from flowing back to the vaporization chamber 11 via the opening 102. Collected water is outputted via a water outlet 121 in a periphery of the container 1 by means of opening a valve 122 on an water output pipe (not labeled) when condensed water in the condensation chamber 11 reaches a certain amount.

The pressure-reducing device 2 includes a vacuum pump 21 and an exhaust duct 22 having a valve 23 and a pressure gauge 24 mounted thereon. The exhaust duct 22 is extended into the condensation chamber 12, and the vacuum pump 21 is operated to reduce pressure in the container 1 to vacuum or lower pressure. The vacuum pump 21 is turned off when the pressure in the container reaches a pre-determined magnitude to avoid steam or liquid from being removed from the condensation chamber 11 by the vacuum pump 21. As the pressure in the container 1 is reduced, the boiling point of seawater 6 (or liquid) in the container 1 is lowered. Relationship between pressure and boiling point of liquid can be found on Handbook of Thermodynamic Tables And Charts, Kuzman Raznjevic, McGraw-Hill Company, 1976, page 112.

Figure 2:
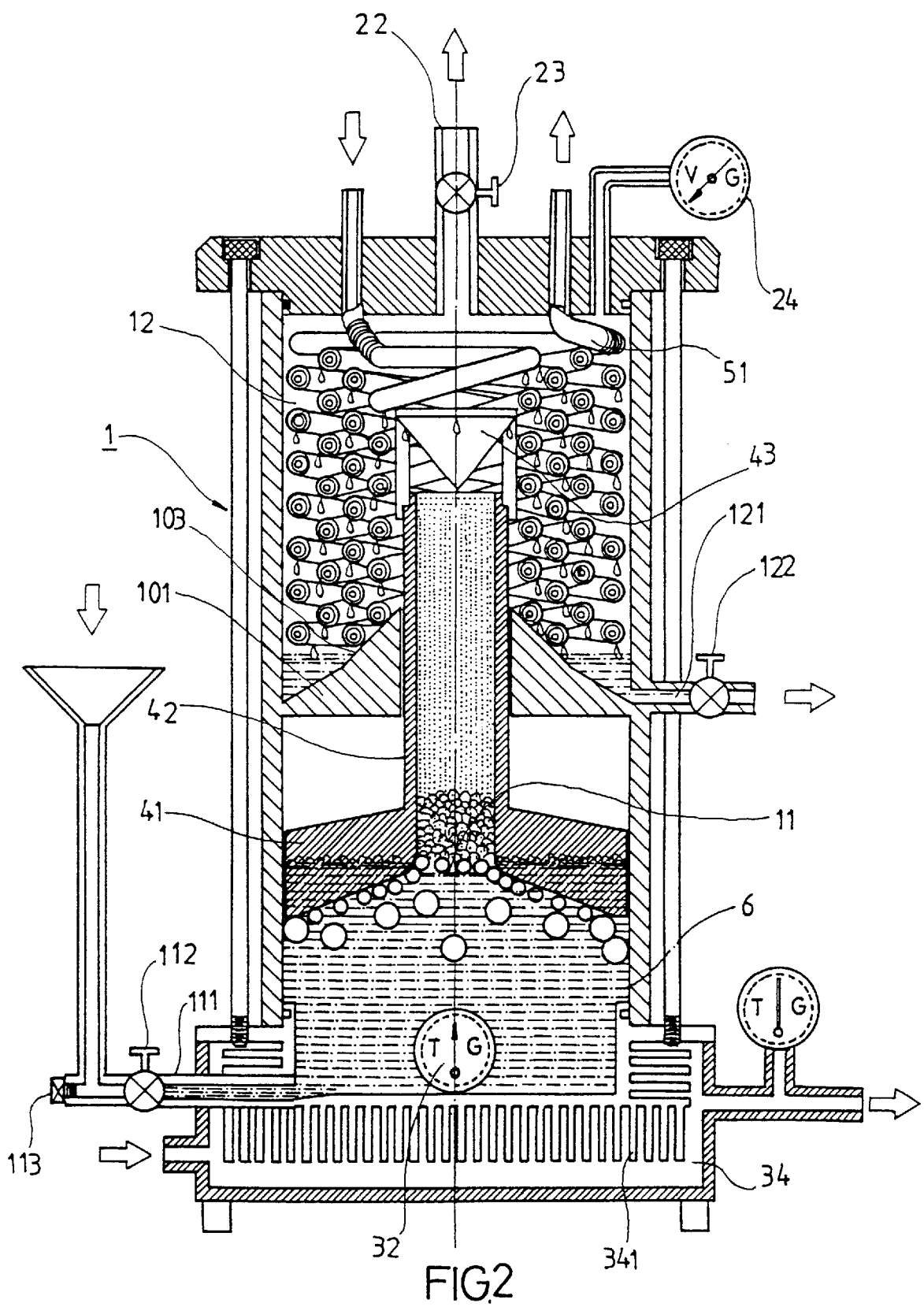
FIG. 2 is a schematic diagram illustrating a modified embodiment of the distilling system in accordance with the present invention.

After pressure reduction in the container 1, the heating device 3 heats and thus vaporizes seawater 6 (or liquid) in the vaporization chamber 11. The heating device 3 preferably includes a heating element 31 mounted to a bottom of the vaporization chamber 11 and a sensor 32 for detecting temperature of a point near the heating element 31 and sending a signal to a microprocessor 33 to thereby keep the heating element 31 at a constant temperature slightly higher than the boiling point of seawater 6 (or liquid) at reduced pressure. Thus, heat required for vaporizing seawater into steam is continuously supplied. The heating device 3 may be replaced by a waste heat-recovery device and an example of which is shown in FIG. 2. As can be seen from FIG. 2, the heating device 3 includes a waste heat tube 34 with a fin 341 to conduct waste heat to seawater 6 (or liquid) in the vaporization chamber 11 as a result of waste heat recovery. A wide variety of waste heat can be used, and for a ship on the sea, waste heat as a result of cooling the engine can be conducted to the heating device 3 by cooling water to reuse waste heat.

The steam-collecting device 4 is provided to collect and guide steam generated in the vaporization chamber 11 into the condensation chamber 12. The steam-collecting device 4 includes a free piston 41 and a guide tube 42. The free piston 41 is in a slidable sealing contact with the inner periphery of the vaporization chamber 11 and shall float up and down in response to the level of seawater 6 (or liquid). Steam is guided into the condensation chamber 12 by the guide tube 42 to reduce the surface contact area between the steam and seawater 6 (or liquid), thereby improving the vaporization efficiency. The free piston 41 is preferably made of heat-insulating material to avoid heat loss and also can float on the surface of the seawater or liquid. The free piston 41 preferably includes an inward conic lower side 411 that contacts with the level surface of seawater 6 to advantageously guide steam into the guide tube 42 in an easier manner. According to test results, the vaporization efficiency of a distilling system without the steam-collecting device 4 is not satisfactory since the steam contact a larger area of the surface of seawater 6 and the inner wall of the container.

The guiding tube 42 extends through the opening 102 and includes an upper end extended into the condensation chamber 12 and a lower end in the vaporization chamber 11. Seawater in the vaporization chamber 11 is heated and thus vaporized by the heating device 3. Steam enters the condensation chamber 12 under guidance of inward conic lower side 411 of the piston 41 and the guide tube 42. The guide tube 42 is preferably made of heat-insulating material to avoid condensation of steam on an inner periphery of the guide tube 42. In this embodiment, heat-insulating plastic material is used to make the guide tube 42, yet other heat-insulating material can be used.

In order to maintain the reduced pressure in the container 1 from not being affected by the steam, the steam that enters the condensation chamber 12 from the guide tube 42 must be immediately condensed into water droplets. The condensation device 5 of the invention is provided to meet this end. The condensation device 5 includes a condensation tube 51 for condensing steam into water droplets. A pump 52 draws a heat-conducting fluid in the condensing tube 51 to carry condensation heat (which is released during condensation of the vapor) to a heat-dissipating element 53, and a cooling fan 54 provides forced convection for dissipating condensation heat carried by the heat-conducting fluid to ambient. The cooled heat-conducting fluid circulates back to the condensing tube 51 for condensing steam entering the condensation chamber 12 into water droplets. The condensing tube 51 surrounds an upper end of the guide tube 42 as well as an area above the guide tube 42. In addition, a nozzle 43 is provided to the upper end of the guide tube 42 for spreading steam from the guide tube 42 to the surrounding condensing tube 51. The nozzle 43 is preferably an inverted cone disposed to the outlet of the guide tube 42 such that steam from the guide tube 42 is spread to the condensing tube 51 along inclined faces of the inverted cone to increase contact area between the steam and the condensing tube 51, thereby increasing the condensation efficiency. It has be found in experiments that the lower the temperature of the heat-conducting fluid, the better the steam condensation efficiency. The condensation device is not limited to that shown in the drawings, other suitable devices may be used, e.g., water cooling devices or pumping coolant by a compressor to replace cooling water pumped by a water pump may be used to improve the steam condensation efficiency. The condensation device may be selected according to energy consumption and the steam condensation efficiency so as to provide the required heat exchange.

Operation of the distilling system includes the following steps.

1. Valve 112 is opened such that seawater 6 (or liquid) is filled into the vaporization chamber 11 via inlet pipe 111 to a pre-determined level and valve 112 is then closed.
2. Valve 23 is opened and vacuum pump 21 is then activated to obtain a pre-determined pressure in the container 1, and the pump 21 is then switched off and the valve 23 is closed.
3. The heating device 3 is activated to heat and thus vaporize seawater 6 (or liquid), and vaporization of seawater 6 (or liquid) is maintained.
4. The pump 52 and the cooling fan 54 are activated to start condensation of steam into pure water (or liquid).
5. Valve 121 is opened to obtain distilled water when the distilled water collected in the condensation chamber 12 reaches a predetermined amount.
6. Step 1 is repeated when the level of seawater in the vaporization chamber 11 is lower than the pre-determined level.

7. When the salt concentration of seawater in the vaporization chamber 11 is too high, all valves and switches are closed/turned off in order to drain seawater with high slat concentration via outlet pipe 113, and step 1 is repeated.

In order to avoid affection of vacuum in the container 1 during seawater refilling by means of inducing air via inlet pipe 111, a sealed reservoir 7 may be provided in front of valve 111, which will be evacuated to the same vacuum level as that of the container 1 before refilling the seawater into the container 1.

Reservoirs can be provided to the seawater inlet pipe 111 and pure water outlet and connected to the vacuum pump 21 of the distilling system such that the reservoirs have the same vacuum therein. Nevertheless, the vacuum may be destroyed and become identical to atmospheric pressure to continuously supply seawater and drain pure water under cooperation of valves, thereby providing a continuously operable system for generating pure water.

The following tables are experiments proceeded under seawater of different salt concentration, different vacuum level, and different condensation devices.

TABLE 1

(Seawater salt concentration: 35000 ppm, cooled by 25° C. water.)

| Experiment No. | Vacuum (mm-Hg) | B.P. of Seawater (° C.) | Salt Concentration of Seawater (ppm) | Water Produced (ml) | Time (min.) |
|---|---|---|---|---|---|
| 1 | 60 | 45.5 | 182 | 340 | 30 |
| 2 | 60 | 45.5 | 175 | 345 | 30 |
| 3 | 120 | 57 | 158 | 378 | 30 |
| 4 | 120 | 57 | 153 | 382 | 30 |
| 5 | 180 | 65 | 137 | 414 | 30 |
| 6 | 180 | 65 | 130 | 419 | 30 |
| 7 | 240 | 72 | 112 | 445 | 30 |
| 8 | 240 | 72 | 108 | 451 | 30 |
| 9 | 300 | 77 | 89 | 474 | 30 |
| 10 | 300 | 77 | 86 | 477 | 30 |

TABLE 2

(Seawater salt concentration: 35000 ppm, cooled by 0° C. water.)

| Experiment No. | Vacuum (mm-Hg) | B.P. of Seawater (° C.) | Salt Concentration of Seawater (ppm) | Water Produced (ml) | Time (min.) |
|---|---|---|---|---|---|
| 1 | 60 | 45.5 | 201 | 547 | 30 |
| 2 | 60 | 45.5 | 197 | 555 | 30 |
| 3 | 120 | 57 | 175 | 582 | 30 |
| 4 | 120 | 57 | 172 | 586 | 30 |
| 5 | 180 | 65 | 151 | 614 | 30 |
| 6 | 180 | 65 | 147 | 620 | 30 |
| 7 | 240 | 72 | 132 | 649 | 30 |
| 8 | 240 | 72 | 127 | 652 | 30 |
| 9 | 300 | 77 | 111 | 675 | 30 |
| 10 | 300 | 77 | 109 | 679 | 30 |

TABLE 3

(Seawater salt concentration: 50000 ppm, cooled by 25° C. water.)

| Experiment No. | Vacuum (mm-Hg) | B.P. of Seawater (° C.) | Salt Concentration of Seawater (ppm) | Water Produced (ml) | Time (min.) |
|---|---|---|---|---|---|
| 1 | 60 | 51 | 193 | 305 | 30 |
| 2 | 60 | 51 | 188 | 311 | 30 |
| 3 | 120 | 61 | 167 | 339 | 30 |
| 4 | 120 | 61 | 164 | 342 | 30 |
| 5 | 180 | 68 | 145 | 375 | 30 |
| 6 | 180 | 68 | 142 | 377 | 30 |
| 7 | 240 | 74.5 | 124 | 410 | 30 |
| 8 | 240 | 74.5 | 119 | 413 | 30 |
| 9 | 300 | 79 | 109 | 439 | 30 |
| 10 | 300 | 79 | 100 | 445 | 30 |

TABLE 4

(Seawater salt concentration: 50000 ppm, cooled by 0° C. water.)

| Experiment No. | Vacuum (mm-Hg) | B.P. of Seawater (° C.) | Salt Concentration of Seawater (ppm) | Water Produced (ml) | Time (min.) |
|---|---|---|---|---|---|
| 1 | 60 | 51 | 214 | 520 | 30 |
| 2 | 60 | 51 | 210 | 525 | 30 |
| 3 | 120 | 61 | 186 | 554 | 30 |
| 4 | 120 | 61 | 183 | 559 | 30 |
| 5 | 180 | 68 | 164 | 583 | 30 |
| 6 | 180 | 68 | 159 | 586 | 30 |
| 7 | 240 | 74.5 | 145 | 617 | 30 |
| 8 | 240 | 74.5 | 138 | 624 | 30 |
| 9 | 300 | 79 | 120 | 645 | 30 |
| 10 | 300 | 79 | 1117 | 651 | 30 |

As can be seen from the above tables, the higher the vacuum (i.e., the lower the pressure), the lower the boiling point (B.P.). The lower the steam pressure as a result of the boiling point that is kept constant, the lower the condensation rate. Accordingly, the salt concentration of the steam is increased such that the salt concentration of the distilled water is increased. Nevertheless, reduction in the boiling point results in lower energy consumption for vaporization and heat exchange. According to the distilling system of the invention, distilled water can be produced by a rate of 1234 ml/hr with a salt concentration of 149 ppm under a pressure condition of 180 mm-Hg with a boiling point of 65° C., which meets the standard for National Drinking Water Standard (water with salt concentration less than 250 ppm) as well as World Drinking Water Standard (water with salt concentration less than 500 ppm).

According to the above description, it is appreciated that the boiling point of seawater is lowered by means of reducing pressure in the sealed container 1 such that distillation of seawater may undergo at low temperature. The distilling system of the invention may also be used to separate liquid mixture containing different liquids with distinct vaporization characteristics at different pressure and different temperature by distillation. More particularly, the distilling system may be set to conditions of different pressure and different temperature to distill every liquid from the liquid mixture one by one, while the solute in the liquid mixture remains in the container.

Although the invention has been explained in relation to its preferred embodiment, it is to be understood that many other possible modifications and variations can be made without departing from the spirit and scope of the invention as hereinafter claimed.

What is claimed is:

1. A distilling system for distilling a liquid, comprising:
    a sealed container including a vaporization chamber for containing the liquid and a condensation chamber;
    a pressure-reducing device connected with the sealed container for reducing pressure in the sealed container, thereby reducing boiling point of the liquid in the container;
    a heating device for heating and thus vaporizing the liquid in the vaporization chamber into vapor;
    a vapor-collecting device comprising a piston for separating the liquid from the vapor and a guide tube for collecting and conveying the vapor generated in the vaporization chamber into the condensation chamber such that a contact area between a level surface of the liquid and the vapor is reduced, and returning of the vapor back to the level surface of the liquid is reduced to improve vaporizing efficiency; and
    a condensing device for condensing the vapor entering the condensation chamber into distilled liquid;
    with proviso that said piston is in a slidable sealing contact with an inner periphery of the vaporization chamber and floatable in response to a change in a level of the liquid in the vaporization chamber to forcibly guide the vapor into the condensation chamber via the guide tube.

2. The distilling system as claimed in claim 1, wherein the sealed container includes a collecting-ring for separating the vaporization chamber from the condensation chamber, the collecting-ring including an opening in a central area thereof, the water-collecting ring further including a periphery and an upper side that inclines downward from an area surrounding the opening toward the periphery.

3. The distilling system as claimed in claim 2, wherein the collecting-ring is made of heat-insulating material.

4. The distilling system as claimed in claim 1, further comprising an inlet pipe for supplying liquid to be distilled into the vaporization chamber.

5. The distilling system as claimed in claim 1, further comprising an outlet pipe for draining distilled liquid from the condensation chamber.

6. The distilling system as claimed in claim 1, wherein the pressure-reducing device includes a vacuum pump and an exhaust duct communicated with the condensation chamber for reducing pressure in the sealed container to a predetermined magnitude.

7. The distilling system as claimed in claim 6, wherein the exhaust duct further comprises a valve and a pressure gauge.

8. The distilling system as claimed in claim 1, wherein the heating device includes a heating element mounted at bottom of the vaporization chamber, a sensor for detecting temperature of the liquid close to the heating element and sending a signal, and a microprocessor for controlling the temperature of the heating element at a constant magnitude slightly above the boiling point of the liquid in the vaporization chamber in response to the signal.

9. The distilling system as claimed in claim 1, wherein the piston includes an inward conic side that is in contact with a level surface of the liquid in the vaporization chamber, and wherein the guide tube extends upwardly from an apex of the inward conic side into the condensation chamber.

10. The distilling system as claimed in claim 1, wherein the guide tube is made of heat insulating material.

11. The distilling system as claimed in claim 1, wherein the piston is made of heat-insulating material.

12. The distilling system as claimed in claim 1, wherein the condensing device includes a condensing tube in the condensation chamber for condensing vapor entering the condensation chamber into liquid, the condensing tube containing a heat-conducting fluid therein, a pump for pumping the heat-conducting fluid to carry away condensation heat as a result of condensation of the vapor, and a heat-dissipating element for dissipating the condensation heat carried by the heat-conducting fluid into ambient air, wherein the heat-conducting fluid is circulated back to the condensing tube in the condensation chamber by the pump after dissipation of the condensation heat.

13. The distilling system as claimed in claim 12, wherein the condensing tube surrounds an upper end of the guide tube and an area above the guide tube.

14. The distilling system as claimed in claim 12, wherein the guide tube includes a nozzle mounted on top thereof for spreading the vapor to the condensing tube to thereby increase condensation efficiency.

15. The distilling system as claimed in claim 14, wherein the nozzle is in the form of an inverted cone with inclined faces mounted in outlet of the guide tube through which the vapor enters the condensation chamber for spreading the vapor to the condensing tube along the inclined faces of the inverted cone.

16. The distilling system as claimed in claim 1, further comprising a reservoir for reserving the liquid to avoid ingress of bubbles into the sealed container.

17. The distilling system as claimed in claim 1, wherein the heating device is a waste heat recovery device.

18. A distilling system for distilling a liquid, comprising:
   a sealed container including a vaporization chamber for containing the liquid and a condensation chamber,
   a heating device for heating and thus vaporizing the liquid in the vaporization chamber into vapor;
   a vapor-collecting device comprising a piston for separating the liquid from the vapor and a guide tube for collecting and conveying the vapor generated in the vaporization chamber into the condensation chamber such that a contact area between a level surface of the liquid and the vapor is reduced, and returning of the vapor back to the level surface of the liquid is reduced to improve vaporizing efficiency; and
   a condensing device for condensing the vapor entering the condensation chamber into distilled liquid;
   with the proviso that said piston is in a slidable sealing contact with an inner periphery of the vaporization chamber and floatable in response to a change in a level of the liquid in the vaporization chamber to forcibly guide the vapor into the condensation chamber via the guide tube.

19. The distilling system as claimed in claim 18, wherein the sealed container includes a collecting-ring for separating the vaporization chamber from the condensation chamber, the collecting-ring including an opening in a central area thereof, the water-collecting ring further including a periphery and an upper side that inclines downwardly from an area surrounding the opening toward the periphery.

20. The distilling system as claimed in claim 18, further comprising an inlet pipe for supplying liquid to be distilled into the vaporization chamber.

21. The distilling system as claimed in claim 18, further comprising an outlet pipe for draining distilled liquid from the condensation chamber.

22. The distilling system as claimed in claim 18, wherein the heating device includes a heating element mounted to a bottom of the vaporization chamber, a sensor for detecting temperature of the liquid to the heating element and sending a signal, and a microprocessor for controlling the temperature of the heating element at a constant magnitude slightly above a boiling point of the liquid in the vaporization chamber in response to the signal.

23. The distilling system as claimed in claim 18, wherein the piston includes an inward conic side that is in contact with a level surface of the liquid in the vaporization chamber, and wherein the guide tube extends upwardly from an apex of the inward conic side into the condensation chamber.

24. The distilling system as claimed in claim 18, wherein the condensing device includes a condensing tube in the condensation chamber for condensing vapor entering the condensation chamber into liquid, the condensing tube containing a heat-conducting fluid therein, a pump for pumping the heat-conducting fluid to carry away condensation heat as a result of condensation of the vapor, and a heat-dissipating element for dissipating the vaporization heat carried by the heat-conducting fluid into ambient air, wherein the heat-conducting fluid is circulated back to the condensing tube in the condensation chamber by the pump after dissipation of the vaporization heat.

25. The distilling system as claimed in claim 24, wherein the condensing tube surrounds an upper end of the guide tube and an area above the guide tube.

26. The distilling system as claimed in claim 24, wherein the guide tube includes a nozzle mounted on top thereof for spreading the vapor to the condensing tube to thereby increase condensation efficiency.

27. The distilling system as claimed in claim 26, wherein the nozzle has the shape of an inverted cone with inclined surfaces mounted in an outlet of the guide tube through which the vapor enters the condensation chamber for spreading the vapor to the condensing tube along the inclined faces of the inverted cone.

28. A method for distilling a liquid, comprising the steps of:
   (a) providing a sealed container including a vaporization chamber for containing the liquid and a condensation chamber;
   (b) reducing pressure in the container to thereby lower a boiling point of the liquid in the vaporization chamber and then heating and thus vaporizing the liquid in the vaporization chamber into vapor;
   (c) collecting and conveying the vapor generated in the vaporization chamber into the condensation chamber in a manner that a contact area between a level surface of the liquid and the vapor is reduced, and the possibility of returning of the vapor liquid back to the level surface of the liquid is reduced to improve vaporizing efficiency; said vapor being collected and conveyed in a piston and guide tube wherein said piston is in a slidable sealing contact with an inner periphery of the vaporization chamber and floatable in response to a change in a level of the liquid in the vaporization chamber to forcibly guide the vapor into the condensation chamber via the guide tube; and
   (d) condensing the vapor entering the condensation chamber into distilled liquid.

29. The method for distilling a liquid as claimed in claim 28, wherein the piston includes an inward conic side that is in contact with a level surface of the liquid in the vaporization chamber, and wherein the guide tube extends upwardly from an apex of the inward conic side into the condensation chamber.

30. The method for distilling a liquid as claimed in claim 28, wherein in the step (d) a condensing tube is provided in the condensation chamber for condensing vapor entering the condensation chamber into liquid, the condensing tube containing a heat-conducting fluid therein, a pump being provided for pumping the heat-conducting fluid to carry away condensation heat as a result of condensation of the vapor, and a heat-dissipating element being provided for dissipating the condensation heat carried by the heat-conducting fluid into ambient air, wherein the heat-conducting fluid is circulated back to the condensing tube in the condensation chamber by the pump after dissipation of the condensation heat.

31. The method for distilling a liquid as claimed in claim 28, wherein the condensing tube surrounds an upper end of the guide tube and an area above the guide tube.

32. The method for distilling a liquid as claimed in claim 28, wherein the guide tube includes a nozzle mounted on top thereof for spreading the vapor to the condensing tube to thereby increase condensation efficiency.

33. The method for distilling a liquid as claimed in claim 28, wherein the nozzle is in the form of an inverted cone with inclined faces mounted in an outlet of the guide tube through which the vapor enters the condensation chamber for spreading the vapor to the condensing tube along the inclined faces of the inverted cone.

34. The method of claim 28 wherein the liquid being distilled is seawater and the pressure in the container is reduced to 60–300 millimeters of mercury.

* * * * *